UNITED STATES PATENT OFFICE.

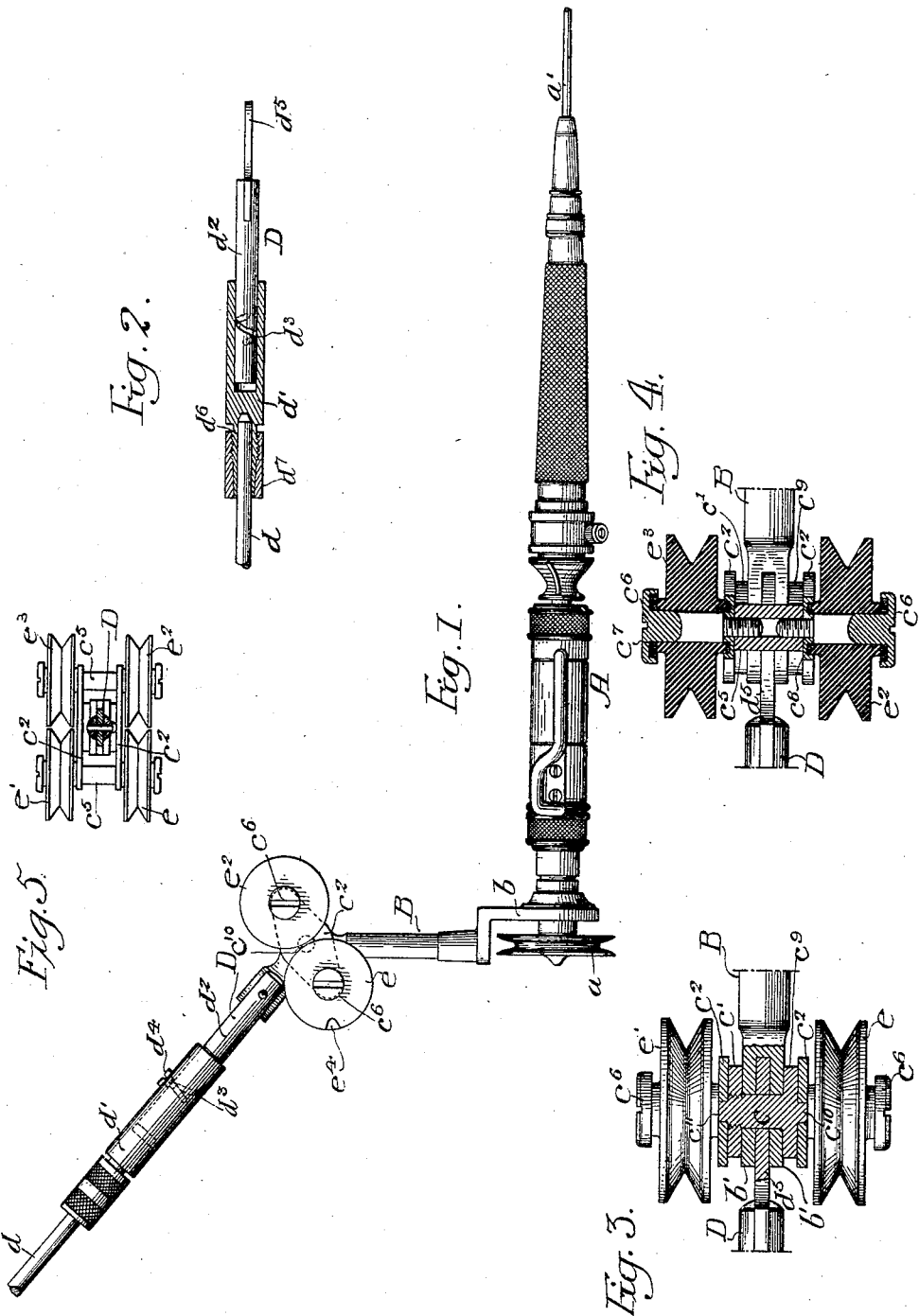

ADOLPH W. SCHRAMM, OF RIVERTON, NEW JERSEY, ASSIGNOR TO ELECTRO DENTAL MANUFACTURING COMPANY, OF PHILADELPHIA, PENNSYLVANIA, A CORPORATION OF PENNSYLVANIA.

WRIST-JOINT FOR DENTAL ENGINES.

No. 908,336.  Specification of Letters Patent.  Patented Dec. 29, 1908.

Application filed October 1, 1907. Serial No. 395,411.

*To all whom it may concern:*

Be it known that I, ADOLPH W. SCHRAMM, a citizen of the United States, residing in Riverton, New Jersey, have invented certain Improvements in Wrist-Joints for Dental Engines, of which the following is a specification.

One object of my invention is to provide a joint of such a nature that it shall be capable of not only preventing the swinging of the end of the forearm of a dental engine about the hand piece, but shall give rise to such an action of the parts as will counteract their tendency to cause such swinging and the consequent winding of the driving cord about said parts.

Another object of my invention is to provide a relatively inexpensive wrist joint, for attachment to the forearm of a dental engine, which, while permitting of a limited movement of the parts relatively to each other, shall be so constructed as to counteract the tendency of the driving cord or belt to cause such movement under operating conditions. It is also desired to provide such an arrangement of guide pulleys that the cord shall at all times remain on two pulleys regardless of the angle between the two parts of the wrist joint or other structure to which my invention is applied. It is further desired to provide a relatively simple device for permitting the cord to be placed upon its supporting pulley or pulleys.

These objects and other advantageous ends I attain as hereinafter set forth, reference being had to the accompanying drawings, in which—

Figure 1, is a side elevation of a hand piece with a wrist joint and part of the forearm, illustrating my invention as applied thereto; Fig. 2, is a vertical section illustrating in detail certain features of the invention; Fig. 3, is an enlarged transverse section illustrating the connection between the members of the wrist joint; Fig. 4, is an enlarged section illustrating the detail construction and mounting of one pair of cord pulleys, and Fig. 5, is a plan partly in section illustrating the particular arrangement of the pulleys on the wrist joint.

In the above drawings A represents a hand piece provided with an internal spindle having an extension carrying a pulley $a$ by which may be driven a drill or other tool $a'$, mounted in the chuck of said hand piece.

Interposed between a chuck member D and a swivel member B is a hinge joint illustrated in detail in Figs. 3 to 5 inclusive, one end of the member B being provided with an arm $b$ in which is a bearing for the extension of the spindle of the hand piece A. The opposite end of the member B is forked as shown in Fig. 3, and receives between its forks $b'$ the flattened end $d^5$ of the chuck member D, these parts being pivotally connected together by means of a headed pin or bolt $c$. This pin has a head $c^9$ on one end and a nut $c'$ on the other, there being on the outer face of the head a projection $c^{10}$ and a similar projection $c^{11}$ on its opposite end beyond the nut $c'$. These projections fit into suitable openings in two parallel plates $c^2$ which extend for equal distances on each side of the pin $c$ and have their adjacent ends spaced a constant distance apart by sleeves $c^5$.

Each sleeve, as shown in Fig. 4, has threaded into it two screws $c^6$, whereby pulleys $e$, $e'$, $e^2$ and $e^3$ are mounted in the relative positions shown in Fig. 5, so that the two pulleys adjacent to each plate $c^2$ are not only substantially tangential but their line of tangency passes through the line of the pivot screw $c$. These pulleys are made of any suitable material such as hard rubber or metal, being grooved for the reception of the cord of a dental engine; and for the purpose of conveniently introducing such cord between each pair of pulleys, I provide a suitably sized recess $e^4$ in the outer flange of one pulley of each pair as shown in Fig. 1. In order that the pulleys may run noiselessly and at the same time be supplied with lubricant as well as have their spindles protected from the entrance of objectionable foreign bodies, such as grit, etc., I recess the under side of the head of each of the screws $c^6$ and place therein a washer $c^7$ of oiled felt. Similarly the face of each plate $c^2$ is provided with an annular recess surrounding the opening for each of the screws $c^6$, for the reception of felt washers $c^8$, it being noted that the pulleys are provided with extended hubs or bosses which fit against the felt washers $c^7$ and $c^8$ as shown in Fig. 4, while the screws have shoulders at the ends of their threaded portions in order to prevent their being set up beyond a predetermined amount.

The end of the forearm $d$ is removably attached to the apparatus hereinbefore described by means of a chuck formed partially of the reduced split threaded and tubular extension of the sleeve $d'$, into the opposite end of which fits the part $d^2$ of the chuck section D. As shown, the second part of the chuck is formed by an internally threaded nut $d^7$ designed to screw on the end $d^6$ of the sleeve $d'$ so as to removably hold the end of the forearm $d$ therein. The part $d^2$, which is pivoted to the swivel section B, is so attached to the sleeve $d'$ as to be free to turn and at the same time move longitudinally to a limited extent. For this purpose I form in the part $d^2$ a helical or other suitable groove $d^3$ of the desired pitch and of such a length that it makes approximately one complete turn around said part. A screw $d^4$ mounted in the sleeve $d'$ fits into this groove, so that as the part $d^2$ is turned relatively to said sleeve, it is compelled, by the screw and the groove, to move into or out of said sleeve, as the case may be.

The use of this device will be understood upon observation of the behavior of an ordinary hand piece under operating conditions, for frequently when the hand piece is held by the operator, the operation of the engine causes the swivel member B and with it the rest of the wrist joint and the end of the forearm, to swing on the spindle of the said hand piece as an axis, thereby winding up the cord or belt in an objectionable manner. Under a heavy working load, the belt has a tendency to rotate the wrist joint around the spindle of the hand piece in one direction. The load also causes an increased tension on the belt which presses together the two members $d'$ and $d^2$ of the chuck section, and it is to be understood that the groove $d^3$ is so formed that its action with the screw $d^4$ tends to cause a rotation opposite in direction to that above mentioned. The pitch or inclination of the groove is such that these two rotative forces are equal and opposite, so that as a consequence there is no movement of the wrist joint. With my arrangement of parts there is therefore, instead of the objectionable winding up or tangling of the cord either a very limited turning of the parts and a slight movement of the part $d'$ over the part $d^2$, or an entire absence of movement. Under operating conditions the engine cord passes between the pulleys $e$ and $e^2$, around the pulley $a$ on the spindle of the handpiece and then between the pulleys $e'$ and $e^3$; all of the pulleys, as shown clearly in Fig. 1, being so arranged that the engine cord when passing from the pulley $a$ necessarily passes the joint between the parts B and D through the line of their pivotal connection. Moreover, owing to the pull of the cord against the pulleys, these latter are, under operating conditions, caused to assume such a position that the line between their spindles $c^6$ bisects the angle formed by the two pieces B and D. Owing to the use of two pairs of pulleys at the point between the members B and D, it is impossible for the cord to leave said pulleys, since it is obvious that its two runs are confined between the pulleys $e$ and $e^2$ and the pulleys $e'$ and $e^3$ respectively. The notch $e^4$ in one pulley of each pair permits of the convenient introduction of the engine cord between the pulleys of such parts.

While I have shown the heads of the screw spindles $c^6$ as formed integral with their body portions, it is to be understood that if desired, I may make them separate from said portions without departing from my invention.

I claim:—

1. The combination with the hand piece and forearm of a dental engine of a joint connection between said parts, the members comprising said connection being free to turn and move longitudinally relatively to each other and having means for counteracting the tendency of the forearm to swing about the hand piece as an axis under the action of the driving cord.

2. A wrist joint having two parts movably connected together so as to permit one of them to turn relatively to the other for a limited distance on a longitudinal axis, with means whereby said turning simultaneously causes a variation in the distance between given points on said parts of the joint.

3. A wrist joint including two members, one of the same being provided with an inclined groove and the other having a projection entering said groove.

4. The combination with a dental hand piece, of a wrist joint consisting of a swivel member providing a bearing for the spindle of the hand piece and a second member consisting of two sections, of which one is movably connected to said swivel member, a pulley for the hand piece, a plurality of pulleys mounted at the point of junction of the swivel member with the second member, and a joint between said two sections constructed to cause one of them to move longitudinally relatively to the other when it is turned axially.

5. The combination of the hand piece, and wrist joint of a dental engine, said wrist joint having means for permitting limited axial turning of its sections relatively to each other, and being constructed to cause longitudinal movement of one of said sections relatively to another when such turning occurs.

6. A wrist joint for a dental engine consisting of two members provided with a pivot pin for connecting them, two plates carried on said pin, spindles connecting the opposite ends of said plates, and two pulleys at each end of the plates mounted on said spindles, the pulleys adjacent to each plate being substantially tangent to each other and so mounted that the line of the pivot between the members of the wrist joint is substantially coincident with their line of tangency.

7. A wrist joint including two parts having a pin whereby they are pivotally connected, two plates mounted on said pin, spindles extending between and connecting the plates at substantially equal distances from the pivot pin, a plurality of grooved pulleys mounted on each of said spindles, the pulleys adjacent to each plate being substantially tangent to each other on the line of the pivot pin, and a hand piece connected to the wrist joint, having a pulley lying in a plane which includes said pivot pin.

8. A wrist joint having two members in combination with two plates, headed spindles on said plates, four pulleys mounted on said spindles, a pivot pin extending between the plates and connecting the two members of the wrist joint, said spindles having annular recesses in their heads and each of the plates also being provided with an annular recess adjacent to its spindle, with washers of absorbent material in said recesses.

9. A wrist joint having a cord guiding pulley, and a supporting structure therefor including a plate, a headed spindle for the pulley, the head of said spindle having an annular recess and the plate also having an annular recess adjacent to said spindle, with washers of absorbent material in said recesses.

10. The combination of a forearm with a wrist joint, and means for connecting said parts, the same including a device for varying the distance between two points on the respective parts of the joint when one of them is turned on the longitudinal axis of said joint, said device having a part constructed to form one member of a chuck for the reception of the forearm, with a sleeve engaging said part and forming the other member of the chuck.

In testimony whereof, I have signed my name to this specification, in the presence of two subscribing witnesses.

ADOLPH W. SCHRAMM.

Witnesses:
WILLIAM E. BRADLEY,
JOS. H. KLEIN.